Aug. 15, 1950 — H. R. HARDING — 2,518,467
LOCK NUT
Filed May 2, 1947

Inventor
HIRAM R. HARDING.
By Howard J. Whelan.
Attorney

Patented Aug. 15, 1950

2,518,467

UNITED STATES PATENT OFFICE 2,518,467

LOCK NUT

Hiram R. Harding, Baltimore, Md., assignor of fifty per cent to Harry E. Karr, Baltimore County, Md., and twenty-five per cent to Logan C. Harding, Hopewell, Va.

Application May 2, 1947, Serial No. 745,582

1 Claim. (Cl. 151—19)

This invention relates to nuts and more particularly to those of the self-locking classes.

In a particular form of nut of a self-locking type, the form follows the general structure disclosed in this application, and has for a feature, the use of an auxiliary nut connected with the main nut to be used on a bolt and locked thereon. They are relatively loose but attachable to the same bolt. The main nut is screwed on and followed by the auxiliary nut serving to wedge on the bolt tightly as it is pulled up. This locks both nuts securely. This type is outlined in the copending invention by the same inventor having Serial Number 665,085 filed on April 26, 1946, now abandoned. While this device is effective in general, it has the characteristic of having its upper lock nut section so shaped that it can cock slightly when placed on a bolt. This permits a certain amount of slip. This slip is desirable in many instances. However in order to afford a more effective lock, this invention modifies the construction in the coacting portions of the nut and the auxiliary nut to make it lock more rigidly. This is accomplished by providing a formation that is straight and flat and has a large straight surface contact between the portions concerned, that is more likely to provide a method of keeping the lock-nut aligned with the nut to prevent the lock-nut portion from becoming cocked in the nut proper and prevent its proper alignment on the bolt it is used on.

It is therefore an object of this invention to provide a new and improved self-locking nut for bolt attachment that will avoid one or more of the disadvantages and limitations of the prior art.

Another object of the present invention is to provide a new and improved nut and bolt attachment, that will wedge very effectively into a self locking arrangement without requiring an increase in the cost of the article and the efforts required to use it.

Another object of the present invention is to provide a new and improved lock nut device in which its lock-nut portion will always be aligned longitudinally with the nut portion proper.

Other objects will become apparent as the invention is more fully set forth.

For a better understanding of the invention and the objects thereof reference is made to the appended drawings and the following description wherein a particular form of the invention is described and detailed by way of example, while the claim emphasizes the scope of the invention.

In the drawings.

Similar reference numerals refer to similar parts throughout the drawings.

Figure 1:
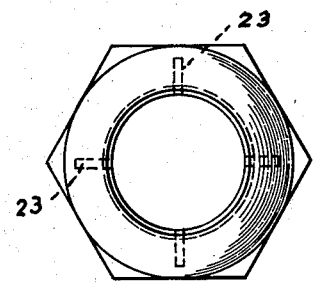
Figure 1 is a plan view of a locknut, embodying this invention.
Figure 2:
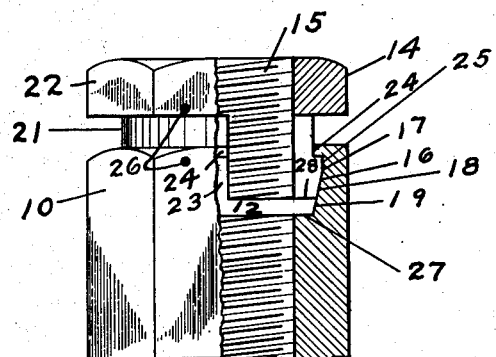
Figure 2 is a side elevation of Figure 1, with parts broken away to show its internal construction.

In the drawings, a main nut body 10 is made of a hexagonal form having one end portion screw-threaded for a bolt thread 11 coming from one end and leading to an enlarged chamber 12 at the other end portion. The wall of the enlarged chamber 12 is not screw-threaded but serves to hold an auxiliary nut 14 which has internal screw-threading 15 throughout similar to that of the threads 11 axially through it. The auxiliary nut has a tapered circular flange 16, which is smaller at its lower end 28 than the upper corner where it joins the face 17 of the flange 16. The peripheral surface 18 of the flange 16 is made slightly tapered so as to conform with the slanting and inwardly tapering wall 19 of the chamber 12. As the auxiliary nut 14 is forced further down by screwing on a bolt into the chamber 12 the tapered periphery and walls 16 and 18 serve to wedge the auxiliary nut tighter and prevents loosening of the nut 10. The middle portion 21 of the auxiliary nut 14 is reduced in diameter to less than the face 17 so as to permit the sliding up and down along an inwardly projected ledge or rim 24 formed in the nut 10 above the chamber 12. The portion 21 is cylindrical as indicated, and is topped by a hexagonal head 22, which is designed to be engaged and operated by a wrench. Spaced slots 23 are cut longitudinally into the auxiliary nut 14 so as to enable it to be resiliently compressed inwardly and thus bite more tightly into the bolt with which it is used as the nut bodies are screwed on further. The slots 23 run in as far as the head 22, and are therefore in the thinnest portion of the auxiliary nut 14. The head 22 by its extra size prevents the auxiliary nut 14 from splitting when pulled-up tightly on the bolt.

The particular feature in the invention is in the use of the ledge or rim 24 and the face 17 which are straight and square and tend to keep the auxiliary nut 14 from tilting and becoming misaligned with the bolt threads it is to work with. This is because the peripheral surface of the auxiliary nut at 21 is also straight longitudinally, although circular transversely.

In addition the square corners of face 17 engaging on the straight internal ringed surface 25 indicated, between a ledge 24 and the tapering surface portion 19 tend also to align the auxiliary nut 14 with the main nut body 10. An indicator 26 is used on the auxiliary nut 14 and nut body 10 to bring the threads on the body 10 and stub 14 in alignment with each other, when they are to be screwed on the bolt.

The auxiliary nut 14 is assembled to the nut body 10 by pressing the slit skirt portions of the nut 14 together. This inwardly forces the flange 16 and face 17 past the ledge 24 and locks the parts together but with a certain amount of looseness that permits their adjustment longitudinally. After the nut body 10 is screwed on to the bolt, the bolt reaches the threads in the auxiliary nut and is screwed therein. After the body 10 has reached its limiting location on the bolt, the auxiliary nut 14 is screwed on further until the taper faces 16 and 19 force the lower portion of the auxiliary nut to become wedged closer on the bolt threads, so that by the time the bottom surface 28 of the auxiliary nut comes in closer contact with face 27 of the nut 10 the locking nut action is severest or tightest.

While but one general form of the invention, is shown in the drawings and described in the specifications, it is not desired to limit this application for patent to this particular form, as it is appreciated the other forms of construction could be made that would use the same principles and come within the scope of the appended claim.

Having thus described the invention, what is claimed is:

A lock nut unit comprising a main nut body having a polygonal contour, said body having two aligned internal chambers, one of said chambers being threaded for attachment to a bolt and extending inwardly from one end face of said body, the other chamber extending between said threaded portion and the other end face of the body and being wider than the first chamber so as to provide an abutment in the meeting plane of said chambers, said second chamber having walls tapering outwardly from said abutment and terminating in a straight cylindrical portion, bounded by an inwardly projecting circular ledge in the plane of the end face of the body, and an auxiliary nut having a polygonal head and a depending cylindrical portion, said cylindrical portion terminating in an outward annular shoulder extending in a horizontal plane, a straight cylindrical portion beneath said shoulder and a tapering portion extending inwardly from said last mentioned cylindrical portion, said depending cylindrical portion, annular shoulder and straight cylindrical portion of said auxiliary nut being adapted to fit in the wider chamber of said main nut body and cooperate with the corresponding portions thereof to positively align the nuts together and prevent tilting of the auxiliary nut within said wider chamber, said aforementioned abutment serving as a stop for the auxliary nut, said auxiliary nut being internally threaded and adapted to cooperate with the bolt on which the main nut is mounted and said auxiliary nut having slits through its side walls so that it may be forced past the aforesaid ledge on the main nut.

HIRAM R. HARDING.

REFERENCES CITED

The following references are of record in the file of this patent:

UNITED STATES PATENTS

| Number | Name | Date |
|---|---|---|
| 1,315,160 | Ross | Sept. 2, 1919 |
| 1,384,019 | Johnston | July 5, 1921 |
| 2,449,846 | Gilman | Sept. 21, 1948 |

FOREIGN PATENTS

| Number | Country | Date |
|---|---|---|
| 250,362 | Great Britain | Apr. 15, 1926 |
| 1,384,019 | Italy | July 5, 1921 |